United States Patent
Mizuma et al.

(10) Patent No.: US 8,428,587 B2
(45) Date of Patent: Apr. 23, 2013

(54) MOBILE COMMUNICATION SYSTEM, POSITION REGISTRATION METHOD, TERMINAL, AND HOME AGENT

(75) Inventors: Keiji Mizuma, Kawasaki (JP); Tatsuhiro Ando, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 566 days.

(21) Appl. No.: 12/625,131

(22) Filed: Nov. 24, 2009

(65) Prior Publication Data

US 2010/0069042 A1    Mar. 18, 2010

Related U.S. Application Data

(63) Continuation of application No. PCT/JP2007/061746, filed on Jun. 11, 2007.

(51) Int. Cl.
| | |
|---|---|
| H04B 1/16 | (2006.01) |
| H04M 1/66 | (2006.01) |
| H04W 24/00 | (2009.01) |
| H04L 12/28 | (2006.01) |

(52) U.S. Cl.
USPC ............... 455/435.1; 455/411; 455/456.1; 370/389

(58) Field of Classification Search ............ 455/435.1, 455/411, 456.1; 370/389
See application file for complete search history.

(56) References Cited

U.S. PATENT DOCUMENTS

| | | |
|---|---|---|
| 2002/0126642 A1 | 9/2002 | Shitama |
| 2004/0047348 A1* | 3/2004 | O'Neill .................. 370/389 |
| 2005/0101321 A1 | 5/2005 | Ikeda et al. |
| 2006/0018273 A1 | 1/2006 | Yamada et al. |
| 2007/0036115 A1 | 2/2007 | Ono et al. |

FOREIGN PATENT DOCUMENTS

| | | |
|---|---|---|
| JP | 2002261806 | 9/2002 |
| JP | 2004129210 | 4/2004 |
| JP | 2005101715 | 4/2005 |
| JP | 2006033541 | 2/2006 |
| WO | 2006093288 | 9/2006 |

OTHER PUBLICATIONS

International Search Report dated Sep. 11, 2007.

* cited by examiner

*Primary Examiner* — Ariel Balaoing
(74) *Attorney, Agent, or Firm* — Smith, Gambrell & Russell, LLP

(57) ABSTRACT

A mobile communication system provided with a home address holding function unit storing one home address, as a representative home address, from among a plurality of home addresses and the rest as subordinate home addresses, a position registration request function unit creating a representative address set and subordinate address sets with the representative home address and subordinate home addresses, acquired from the holding function unit, and a corresponding representative care-of address and subordinate care-of addresses and further sending a position registration request by only the representative address set, and a position registration function unit receiving the representative home address and subordinate home addresses acquired from the holding function unit, creating subordinate address sets from the representative address set relating to the position registration request, and registering the position of the representative address set simultaneously with the registration of the positions of the subordinate address sets.

17 Claims, 10 Drawing Sheets

FIG.4

HoA LIST

| GROUP RELATIONSHIP DATA | |
|---|---|
| REPRESENTATIVE | HoAa |
| SUBORDINATE 1 | HoAb |
| SUBORDINATE 2 | HoAc |
| ⋮ | ⋮ |
| SUBORDINATE n | HoAk |

MOBILE COMMUNICATION SYSTEM, POSITION REGISTRATION METHOD, TERMINAL, AND HOME AGENT

CROSS-REFERENCE TO RELATED APPLICATION

This application is a continuation application based on International Application No. PCT/JP2007/061746, filed on Jun. 11, 2007, the contents being incorporated herein by reference.

FIELD

The present embodiments relate to a mobile communication system, more particularly a mobile communication system including an Internet Protocol version 6 (IPv6) mobile network, in further detail, a position registration method executed between a terminal in the mobile network and a home agent. It further relates to a terminal and a home agent.

BACKGROUND

In recent years, demand has been increasing for mobile services based on IP architecture. Frameworks that efficiently register positions for service use of a mobile user are being sought in mobile networks. Particularly, when using a plurality of types of services and each of the services belongs to a different domain, a terminal has to simultaneously execute a plurality of position registrations corresponding to a plurality of types of services with respect to a home agent, and therefore, a framework that efficiently carries out this position registration is preferable.

Several service providers that provide end users with so-called multi-home environments in which the services belong to different domains already exist. These end users are able to simultaneously connect to this plurality of types of service providers by the assignment of a plurality of IP addresses to their terminals.

Such a state of simultaneous connection is already possible with IPv4 and IPv6. However, the connection method is limited to a fixed connection.

In this regard, in recent years, the demand for mobile services has grown and such multi-home environments have become desirable in mobile terminals as well. As mobile services, there currently are IP telephone services, Internet connection services, email services, Voice Over IP (VoIP) services, etc., but when using for example the above IP telephone services and Internet connection services, it is desirable for the end user to connect the two service providers providing these two services simultaneously.

In this case, the IP address assignment of a mobile terminal of an end user changes due to movement, so special mobile management technology is desirable to maintain the above simultaneous connection state. The present invention is proposed based on the related technical background. This background art will be specifically explained below.

[IPv6 Multi-home Environment]

In IPv6, a broad address space is assigned to the end users. This enables each end user to possess a plurality of global IP addresses.

There are three types of IPv6 addresses: unicast, multicast, and anycast. Among these, unicast is further broken down into the three following types depending on the valid scope of the address. Note that the above global IP address to be assigned to the end user is the global unicast address a) below.

a) Global unicast address: A globally valid unicast address with no limitation of scope.
b) Site local unicast address: A unicast address defined as being valid only within the same site, but now discarded.
c) Link local unicast address: A unicast address valid only within the same link (subnet) and used for address resolution with a different host on the same link and for communicating control information such as routing protocol.

FIG. 8 is a view illustrating the format of the above a) global unicast address. In this figure, the global unicast address is broadly divided into a prefix and an interface ID which is automatically created by the operating system inside the terminal on the basis of a Layer 2 MAC (Media Access Control) address.

This prefix, as illustrated, is broken up into a 48 bit prefix comprised of a 3 bit header and a 45 bit global routing prefix and of a 16 bit subnet ID. The former 48 bit prefix is the portion that is automatically assigned by the service provider when the end user registers for a service provider.

On the other hand, the end user can use any subnet ID, where $2^{16}$ number of independent subnets can be freely defined. Accordingly, in the above mentioned multi-home environment, an end user is able to selectively use the different registered services within a single environment by the subnet IDs. This can be illustrated as follows.

FIG. 9 is a view schematically illustrating an example of the above multi-home environment. In this drawing, the user network of the end user comprises, for example, a computer or other apparatus PC, a TV or other apparatus TV, and a mobile device or other mobile node MN. These use the access network of a telephone carrier to connect to three providers A, B, and C and receive corresponding services.

In this case, the providers A, B, and C have unique prefixes different from each other. The above apparatuses PC, TV, and MN also have unique prefixes different from each other. Between these providers and apparatuses, independent tunnels A, B, and C are formed through a center broadband router. Due to this, the above providers and apparatuses, if not corresponding to each other, cannot access each other.

Note that, the above-mentioned broadband router has an IPv6 pass-through function. The IPv6 apparatus is able to directly communicate with the outside.

With the global unicast address illustrated in FIG. 8, an end user can have $2^{16}$ number of subnet IDs, so an end user can contract with a plurality of (for example, three) service providers (A, B, and C) and the service providers can assign their IP addresses (global routing prefixes) to the end user. Thus, an end user can simultaneously connect to a plurality of types of service providers.

Note that the same is also possible for IPv4, but there are major differences (merits) in IPv6 from IPv4 in the following points.

1) The assigned address space is broad.
2) When a broadband router is used, the address of each apparatus (PC, TV, and MN) of the end user becomes a private address under the IPv4. However, under the IPv6, each apparatus itself has a global address, so it becomes possible to use external services which require direct communication.

Above, an IPv6 multi-home environment for a user network was explained. Next, a mobile IP will be explained. The mobile IP is a base technology in explaining the IPv6 multi-home environment covering a mobile network.

[Mobile IP]

FIG. 10 is a view explaining in brief a mobile IP forming the basis of the above mobile network. In this figure, Mobile Node (MN) indicates a terminal (mobile terminal), AR an advertising router, HA a home agent, CN (Correspondent Node) a terminal of the other party in the communication, and AAA (Authentication, Authorization, and Accounting) an authentication/authorization server.

Further, the arrows in the figure (e, f, g, etc.) represent the operations occurring between the corresponding devices, wherein e: represents an access authentication taking place between AAA and MN when the terminal MN first connects to the network NW, f: represents a mobile IP authorization taking place between HA and AAA, g,g': represent prefix advertisements, that is, Router Advertisements, h,h': represent position registrations from MN to HA, that is, Binding Updates, and i,i': represent transmission/receipt of data packets between CN and MN.

When engaging in IP communication in a radio network, if the terminal MN moves, the network that the MN connects to changes and accordingly the IP address assigned to the terminal MN changes at its new location. At this new location, when sending a signal from the terminal MN to another party, communication is possible by using the IP address of the MN. Conversely, when trying to send a signal from the other party of communication, for example, CN, to the terminal MN, it is desirable to know in advance the fixed destination and the destination address of the other party of communication.

The "fixed destination" refers to a device inside a network domain called a home network which is accessible from other networks. In this network domain, a permanent address is assigned to a terminal MN. Further, each time the terminal MN moves, a position registration request is sent to this home network so as to link the address assigned at the new location to the permanent address. Due to this, packets from the CN are transferred to the MN through the home network, thus allowing arrival of packets at the MN.

Such technology is called "mobility management". Various systems have been proposed. A leading technology among these is the mobile IP illustrated in FIG. 10. In this mobile IP, an address assigned to an MN terminal in the network of the new location is called a care-of address (CoA) (CoAa or CoAb in the figure). On the other hand, an apparatus called a home agent (HA) is installed in the home network. The HA manages the permanent home address HoA assigned to the terminal MN while binding with the care-of address CoA. Then the HA broadcasts a router advertisement (RA) relating to the HoA to the surrounding routers. Due to this, all packets sent addressed to the HoA are forwarded to the HA, then the packets are transferred to the network to which the terminal MN is being connected.

Thus, to enable packet transfer to the MN through the HA, it is desirable for the terminal MN to register its position. To do this, the MN at the new location sends a binding update message to the HA. The position-registered terminal MN forms a tunnel to the HA by IP in IP or IPSec or the like so as to send and receive packets through this tunnel.

Note that, as known art according to the present invention, there are the following Patent Literature 1, Patent Literature 2 and, Patent Literature 3.

Patent Document 1 describes a first home agent apparatus registering as a care-of address a second home address used in a domain network of a new location when a mobile terminal moves to another domain network different in service form.

Patent Document 2 describes, when packets destined for a representative home address or subsidiary home address arrive from any communication node, searching through the held registered information for binding information including the address and transferring packets to the corresponding care-of address.

Further, Patent Document 3 describes a mobile node moving between subnets of different domains by using a virtual network prefix-based IPv6 address as a care-of address for a home agent which manages the mobile node.

Patent Document 1: Japanese Laid-Open Patent Publication No. 2004-129210

Patent Document 2: Japanese Laid-Open Patent Publication No. 2005-101715

Patent Document 3: Japanese Laid-Open Patent Publication No. 2002-261806

FIG. 11 is a view for explaining the problems when applying a multi-home environment to a terminal (mobile terminal). The differences from the FIG. 9 are that the user network of FIG. 9 is replaced with a radio network and that the mobile terminal MN connects to a different radio network each time it moves. Further HA, AR, etc. illustrated in FIG. 10 are also described.

When using the mobile IP illustrated in FIG. 10, the IP address of the terminal MN to be recognized by the other party for the connection is the home address HoA. Accordingly, in the case of a multi-home environment, the connections are between the home agent HA and the service providers (A, B, and C), and therefore, it is desirable to link respective home address HoA (see HoAa, HoAb, and HoAc in FIG. 11) to each of the homes of the service providers (A, B, and C).

Further, it is desirable for the terminal MN to store a different care-of address CoA for each location for each of these HoAa, HoAb, and HoAc (refer to CoAa, CoAb, and CoAc; CoAa', CoAb', and CoAc'; CoAa", CoAb", and CoAc" of FIG. 11). Therefore, it is desirable to register the positions of HoA and CoA for each of the providers A, B, and C.

Further supplementing the explanation of FIG. 11, a terminal MN moving to three locations corresponds to the terminal MN in the user network of FIG. 9 and, inside the terminal MN, there are three subnet IDs (FIG. 8) corresponding to the providers (A, B, and C).

Further, a CoA-HoA tunnel is formed between the terminal MN and home agent HA for each service provided by the providers (A, B, and C). Further, each time the terminal MN moves, the tunnel is reformed like CoA-HoA, CoA'-HoA, and CoA"-HoA. Accordingly, the home address HoA does not change regardless of the movement of the terminal MN, while the care-of address CoA is updated along with the movement. In this case, the home agent HA controls the connection between the terminal and the provider for each HoA.

As explained above, each time the terminal MN moves, a binding update message for position registration must be sent and received between the terminal MN and the home agent HA for exactly a number of times corresponding to the number of providers (A, B, and C), that is the number of HoA-CoA, HoA-CoA', and HoA-CoA". Further, the authentication and authorization required when registering positions also must be carried out for exactly a number of times corresponding to the number of providers (A, B, and C). Therefore, a packet loss and packet delay are liable to occur. Ultimately, this degrades the quality of transmission in the mobile communication system.

SUMMARY

Accordingly, it is an object of the embodiment to provide a mobile communication system capable of suppressing deterioration in the quality of transmission resulting from the above-mentioned packet loss and packet delay.

Further, another object is to provide a position registration method carried out in a mobile communication system and a terminal and home agent making up the system.

FIG. 1 is a view illustrating the basic configuration of a mobile communication system according to the present embodiment. The mobile communication system illustrated in the present figure is a mobile communication system comprising at least a terminal MN receiving a plurality of types of services and a home agent HA receiving a position registration request from the terminal MN when the terminal MN moves, wherein the system contains a home address holding function unit 2, a position registration request function unit 3, and a position registration function unit 4.

Here, the home address holding function unit 2 sets and holds a plurality of home addresses (HoA) corresponding to a plurality of types of services, where one of the home addresses is set as a representative home address and the rest is set as subordinate home addresses.

The position registration request function unit 3, at the terminal MN side, creates a representative address set and subordinate address sets from the representative home address and subordinate home addresses which are acquired from the home address holding function unit 2 and the representative care-of address and subordinate care-of addresses which correspond to these home addresses. Further, the unit 3 sends a position registration request to the home agent HA by using only the representative address set.

The position registration function unit 4, at the home agent HA side, receives the representative home address and subordinate home addresses which are acquired from the home address holding function unit 2, creates subordinate address sets from the representative address sets relating to the above position registration request, and registers the positions of the subordinate address sets simultaneously with registration of the position of the representative address set.

Preferably, the system is further provided with an authentication and authorization server AAA for performing at least authentication and authorization for the terminal MN and forms the home address holding function unit 2 within the authentication/authorization server AAA.

The embodiment further provides a position registration method. That is, it provides a position registration method which basically comprises the processing flow illustrated in FIG. 2 in a mobile communication system comprising at least a terminal MN receiving a plurality of types of services and a home agent HA receiving a position registration request from the terminal MN when the terminal MN is moving.

In FIG. 2,

Step S11: a plurality of home addresses HoA of the home agent are set to correspond to a plurality of types of services. One of the provided plurality of home addresses HoA is set and held as a representative home address and the rest are set and held as subordinate home addresses.

Step S12: at the terminal MN, a representative care-of address (CoA) paired with the representative home address is created to make a representative address set. Using this representative address set, a position registration request is made to the home agent HA.

Step S12: at the home agent HA, subordinate care-of addresses (CoA) paired with the set subordinate home addresses and forming subordinate address sets are created based on the representative address set according to the position registration request. The positions of the subordinate address sets are simultaneously registered with the position of the representative address set.

Even when the terminal MN is moving while keeping a multi-home connection, the position registration request to be executed when moving to the home agent HA is for the representative address set (HoA-CoA) only. Accordingly, the load required for position registration is almost equal to the load under normal single-home connection.

In this case, if a process similar to normal single-home connection is used to carry out the above multi-home connection (for example, N times of single-home connections), the load required for the position registration is simply multiplied by N-times resulting in an extremely heavy load and packet loss and delay and the like will cause serious quality deterioration. However, according to the present invention, the above-mentioned load remains the same and such quality deterioration is prevented. Therefore, the invention is extremely beneficial for mobile communication technology for the future anticipated multi-home environments.

BRIEF DESCRIPTION OF DRAWINGS

FIG. 4 is a view illustrating an example of a home address (HoA) list.

DESCRIPTION OF EMBODIMENTS

Figure 1:
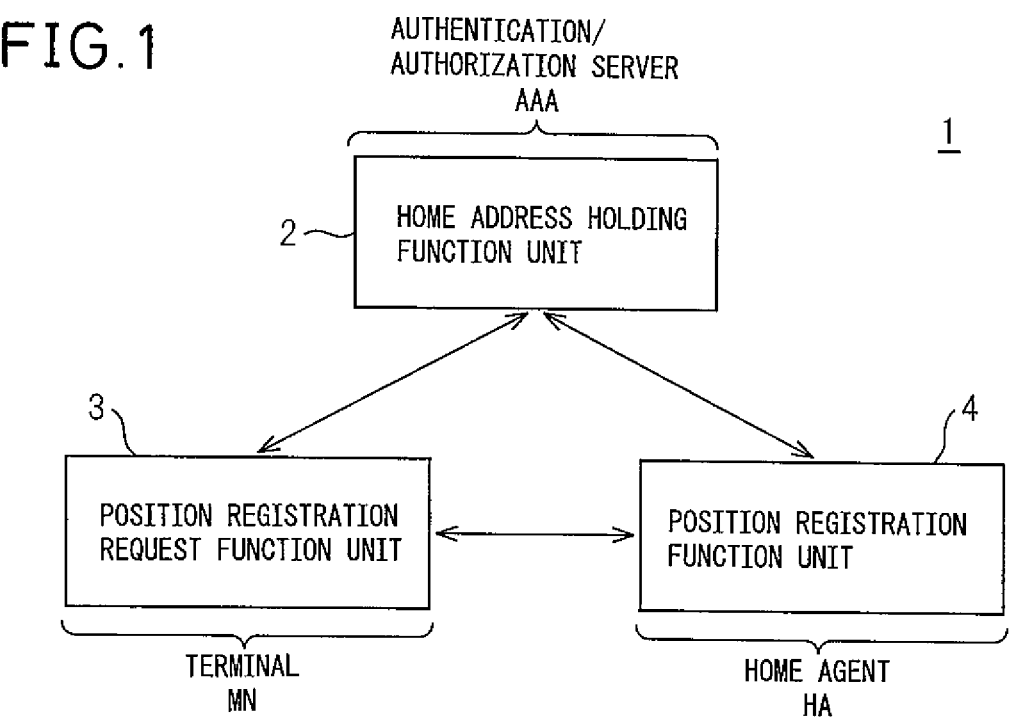
FIG. 1 is a view illustrating the basic layout of a mobile communication system according to the embodiment.
Figure 2:
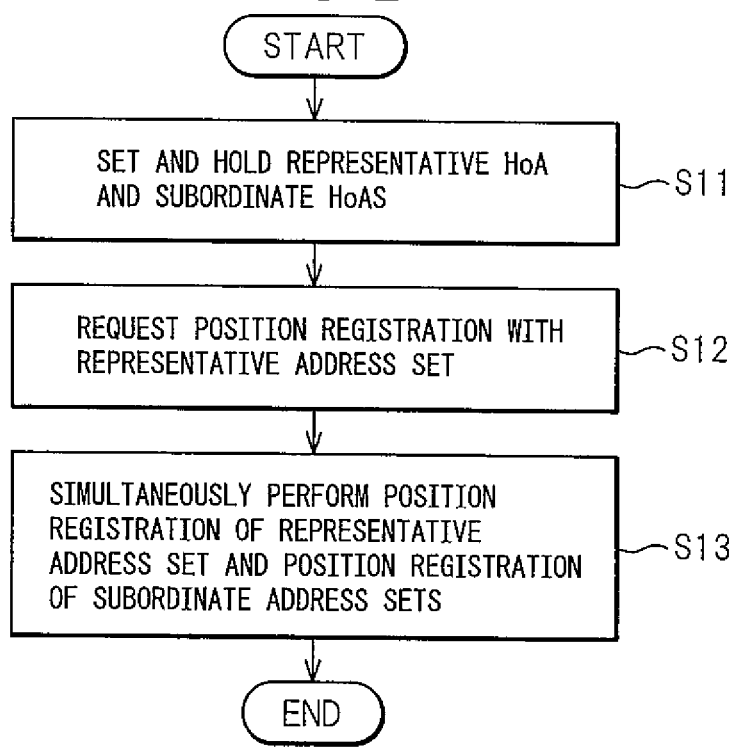
FIG. 2 is a flowchart illustrating the basic steps of a position registration method according to the embodiment.
Figure 3:
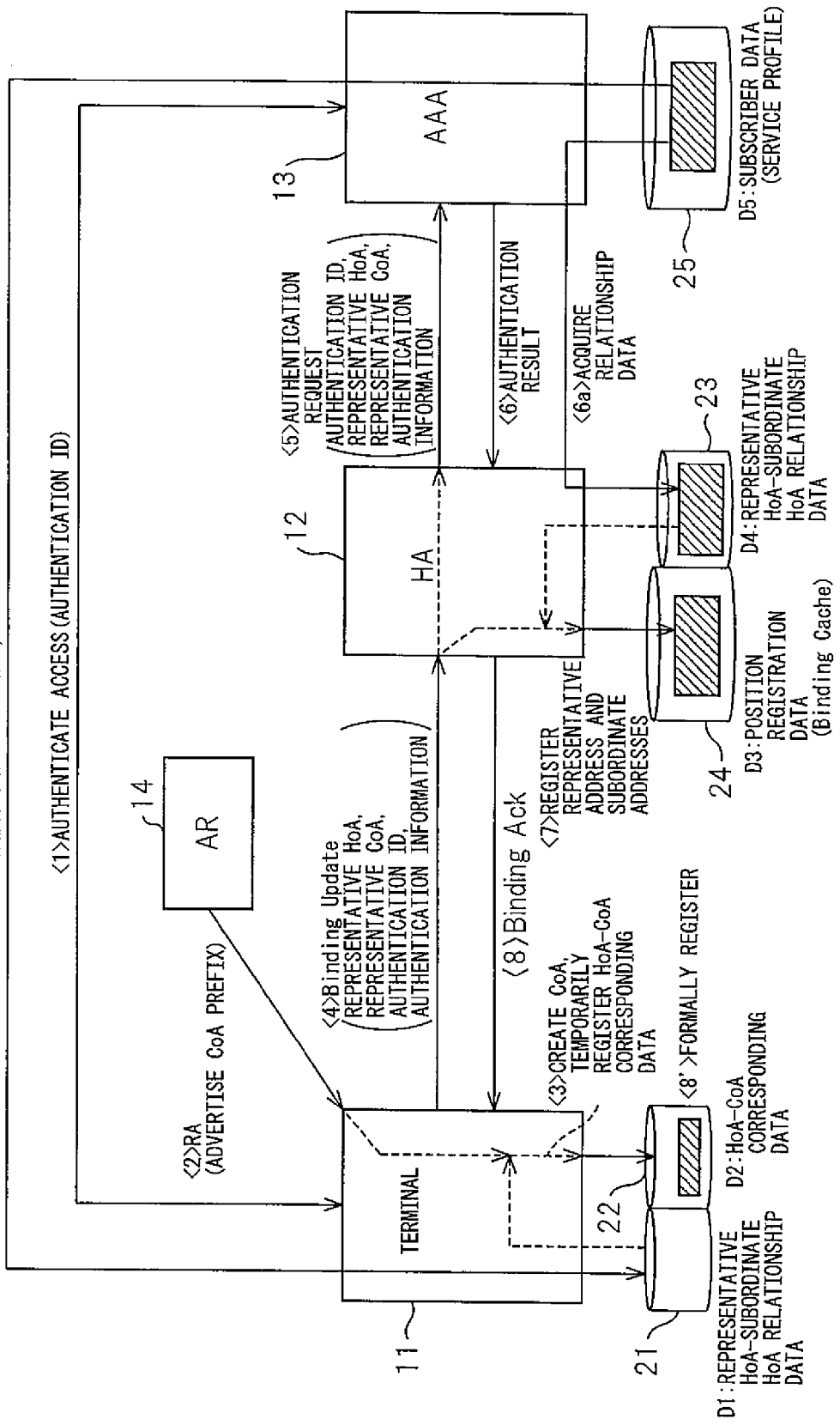
FIG. 3 is a view illustrating a mobile communication system based on a first embodiment of the present invention.
Figure 11:
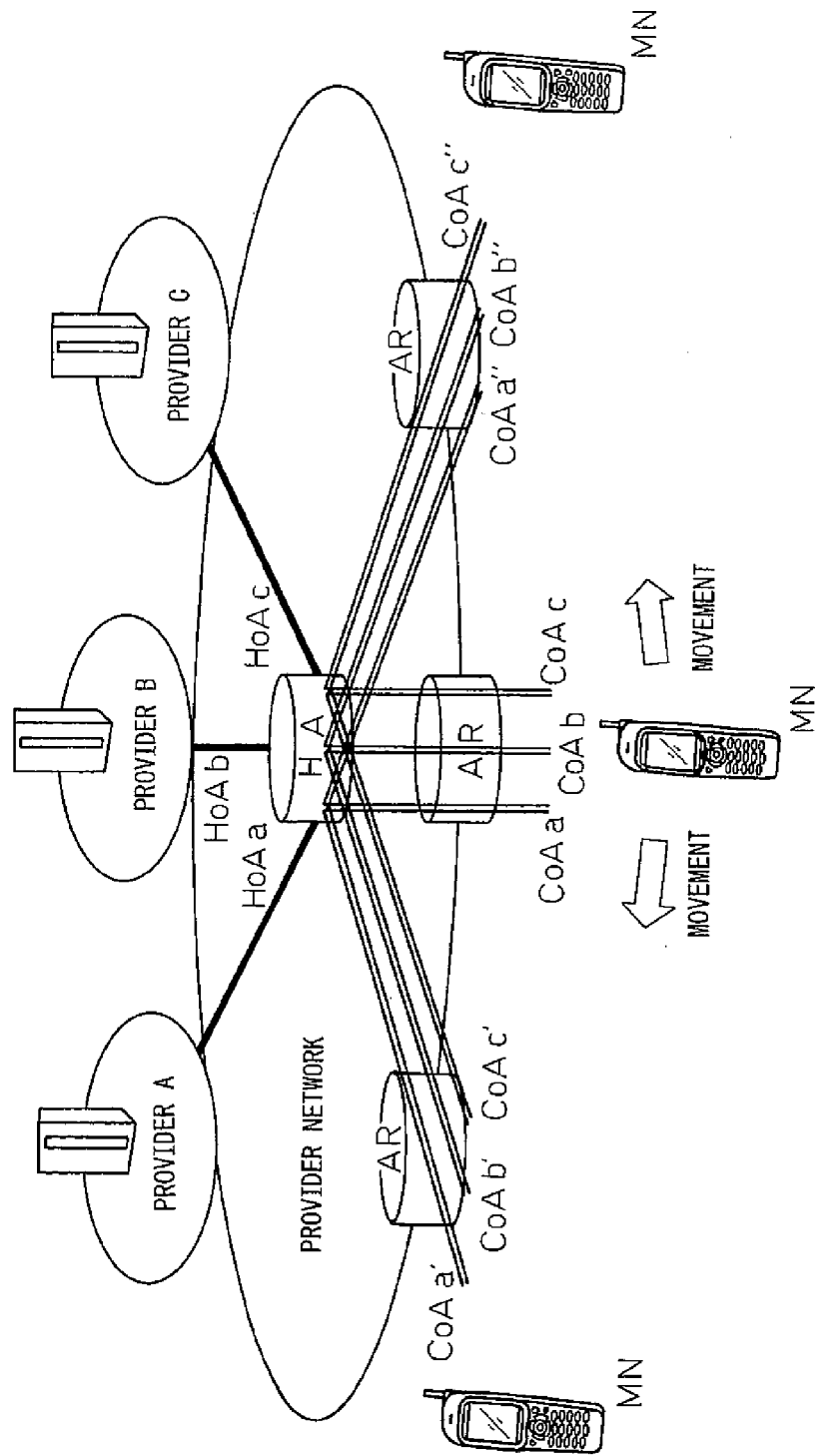
FIG. 11 is a view explaining the problems when applying a multi-home environment to a terminal.

FIG. 3 is a view illustrating a mobile communication system based on a first embodiment of the present invention. In this mobile communication system 10, there are a plurality of address sets, each comprised of a pair of a home address (HoA) and a care-of address (CoA) assigned to a terminal 11, corresponding to the providers (A, B, and C) (see FIG. 11). There, one address set among the plurality of address sets is set as a representative address set (for example, HoAa-CoAa), while the other address sets (for example, HoAb-CoAb and HoAc-CoAc) are set as subordinate address sets.

Further, the position registration from the terminal 11 with respect to the home agent 12 is carried out simultaneously with the position registration for the subordinate address sets by only one binding update message containing the representative address set.

Figure 8:
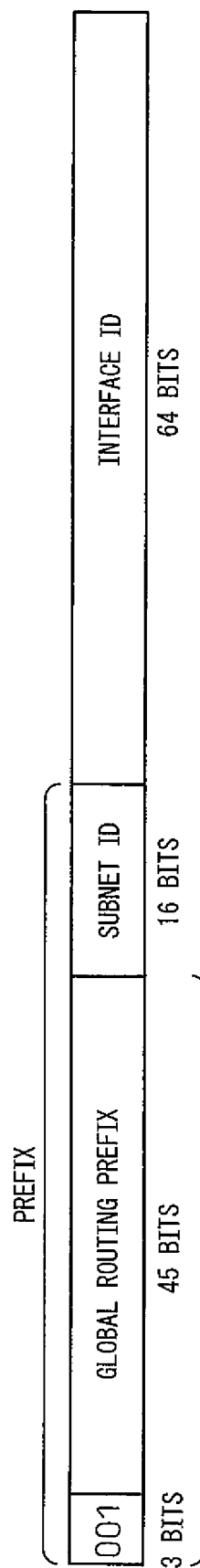
FIG. 8 is a view illustrating the format of a global unicast address.
Figure 9:
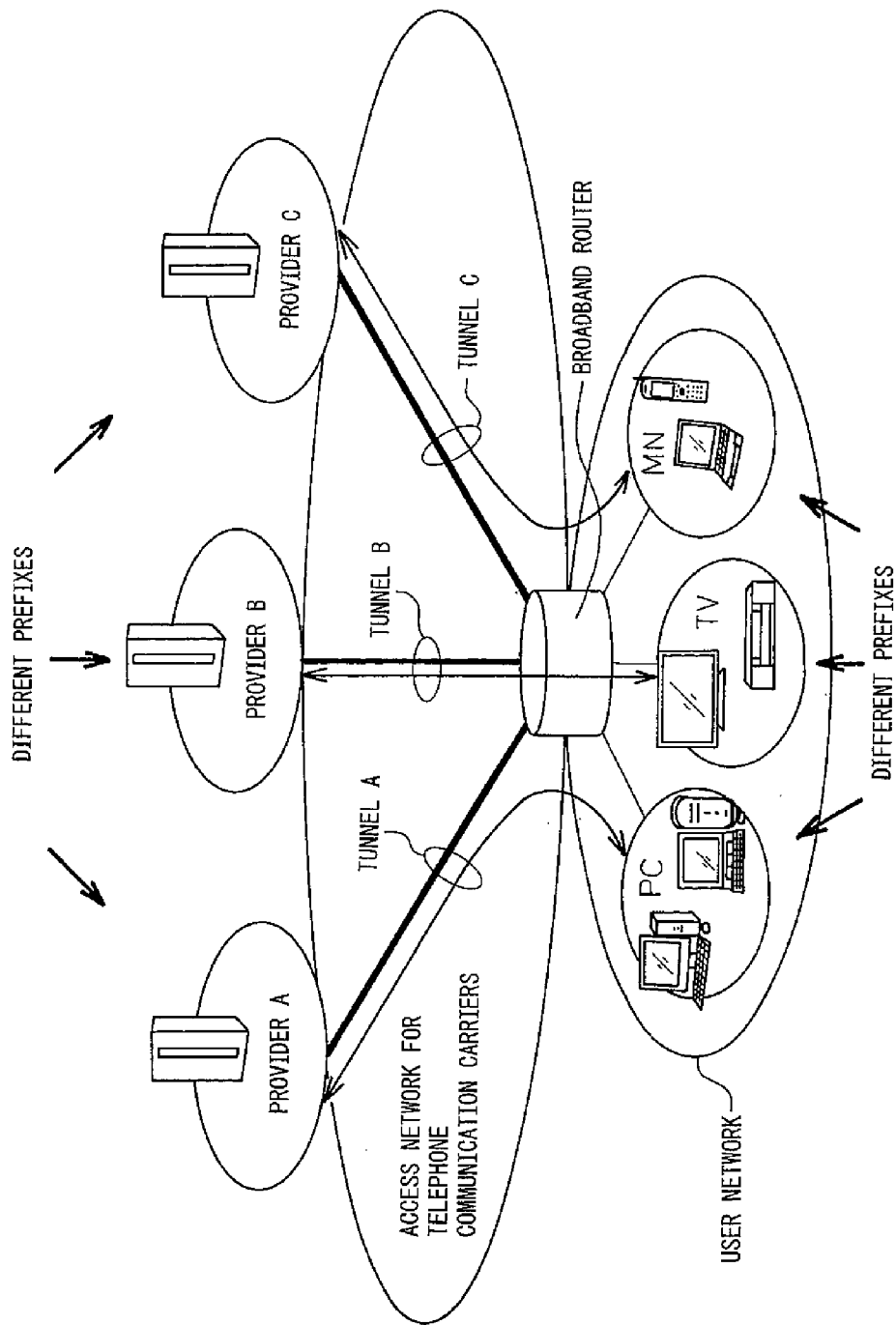
FIG. 9 is a view schematically illustrating an example of a multi-home environment.
Figure 10:
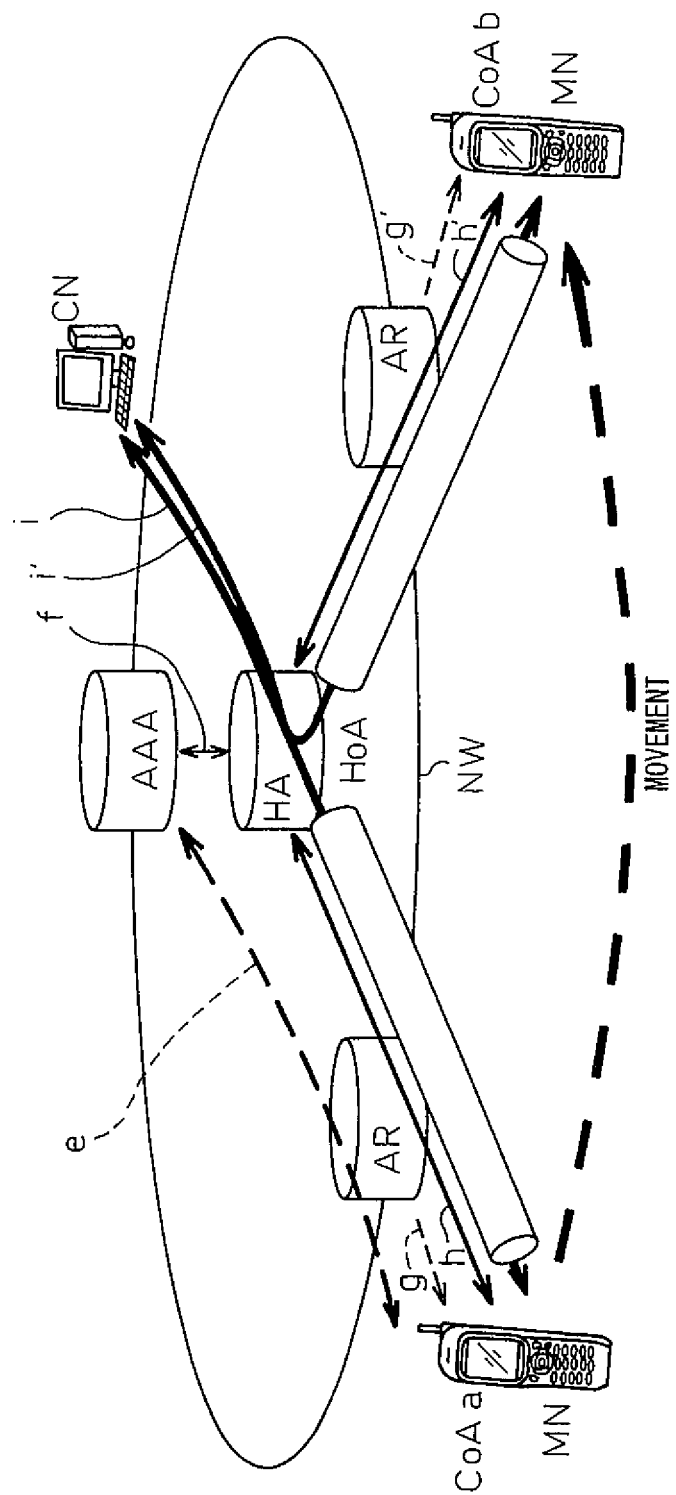
FIG. 10 is a view explaining an overview of a mobile IP forming the basis of a mobile network.

In this case, for identification of the representative address set and subordinate address sets, a portion of the bit string of the IP address assigned to the terminal 11 may be used as an identifier. For example, in IPv6, the subnet ID (FIG. 8) may be used as an identifier.

In IPv6, the user side may determine the assignment of the subnet ID. Thus, when the terminal 11 moves and assigning a CoA at the new location, the subnet ID expressing this CoA may be set as the same subnet ID of the subnet ID in the corresponding home address HoA. Further, the global routing prefix of the CoA is assigned at the new location of the terminal 11. Therefore, this global routing prefix becomes the same between the representative care-of address (CoA) and the subordinate care-of addresses (CoA). Note that, the terminal 11 is assigned the same interface ID (FIG. 8) for the representative CoA and the subordinate CoAs.

On the other hand, the home agent (HA) 12 acquires and holds data illustrating the group relationship of the representative home address (HoAa) and subordinate home addresses (HoAb, HoAc) from the authentication/authorization (AAA) server 13. Here, when receiving a binding update message of only the representative address set (HoAa-CoAa) from the terminal 11 at the new location, the HA 12 registers the position of that representative address set. At this time, it refers to the above group relationship data and simultaneously registers the positions of the subordinate address sets as well.

In this case, the home agent (HA) 12 registers the positions for the subordinate address sets as detailed below.

(i) It refers to the group relationship data and extracts the subordinate home addresses HoA (HoAb, HoAc) subordinate to the representative home address HoA (HoAa) from the representative home address HoA in the representative address set currently received from the terminal 11.

(ii) It uses the subnet IDs of the extracted subordinates HoA to replace the subnet ID of the representative care-of address CoA received from the terminal 11 and creates subordinate care-of addresses CoA. This is carried out for subordinate HoAb and subordinate HoAc also, whereby the subordinate CoAb and subordinate CoAc are created.

(iii) It combines the subordinate home addresses HoA (HoAb, HoAc) extracted in the above (i) and the care-of addresses CoA (CoAb, CoAc) created in the above (ii) to obtain subordinate address sets (HoAb-CoAb, HoAc-CoAc). Using these subordinate address sets, it registers the positions for the providers (B, C) as well.

For the mobile IP, as an option, there is a specification performing authentication (mobile IPv6 authentication defined in RFC4285). In this case, the authentication ID that the terminal 11 uses is made one common for the representative home address HoA and the subordinate care-of addresses CoA. Further, the HoA and CoA used as the authentication information from the HA 12 to the AAA server 13 are the representative HoA and representative CoA received from the terminal 11. The authentication key for hashing the authentication information, at this time, may be prepared for only the representative address set (HoA-CoA).

The group relationship data of the above (i) is registered by the AAA server 13 in advance as subscriber data which makes up the service profile at the time the user enters the contract. By this, when the HA 12 is carrying out authentication and authorization of the mobile IP of the terminal 11 with the AAA server 13, it can also obtain the group relationship data from the AAA server 13.

Incidentally, the group relationship (i.e., representative-subordinate relation) can be defined not only in the IPv6 but in the IPv4 as well. However, unlike IPv6, the CoA in the case of the IPv4 is determined by the network of the new location moved to, so the subnet ID cannot be determined by the terminal itself as in the IPv6. Further, in the IPv4, the assignment of a specific address set, through agreements between the home network and the network of the new location, may be considered. However, the size of the IPv4 address space makes this unfeasible.

The main points of the mobile communication system 10 of FIG. 3 were described above, but here the entire system will be explained in brief. <1>, <2>, <3> . . . in the figure indicate the operation steps. Among these, <1a> and <6a> are steps of particular note.

<1> When the terminal 11 first connects to a network or when re-authentication is demanded by an authentication-authorization (AAA) server 13, access authentication is carried out.

<1a> Together with the above <1> step, the group relationship data, that is, the HoA list and representative HoA (refer to FIG. 4), is acquired from the subscriber data D5 for the service profile registered in the database 25 in advance (at time of contract etc.)

Due to this, the terminal 11 stores data D1 illustrating the group relationship (FIG. 4) between the representative HoA and the subordinate HoAs in a database 21 inside 11.

<2> When the terminal 11 moves to the present network and the authentication <1> ends, the above advertisement router (AR) 14 performs a router advertisement RA to the terminal 11, and the terminal 11 receives an advertisement of care-of address CoA.

<3> The terminal 11 creates address sets (HoA-CoA) corresponding to the providers (A, B, and C) using the received HoA and CoA by processing similar to (i), (ii), and (iii). Further, it temporarily registers the created address sets in the database 22 as HoA-CoA corresponding data D2. Then, the terminal 11 issues a position registration request to the HA 12. The addresses remain as temporary registrations until position registration is officially complete.

<4> At the new location, the terminal 11 sends a binding update (B.U.) message to the HA 12. This B.U. message contains the HoA and CoA, authentication ID, authentication information, etc. The point of particular note here is that only the representative HoA and representative CoA are sent as the HoA and CoA. That is, transmissions to the HA 12 of B.U. messages corresponding to the number of subordinate HoAs are omitted. This solves the above-mentioned problem.

<5> The HA 12 receiving the B.U. message in <4> sends an authentication request for the terminal 11 to the AAA server 13. This authentication request contains the B.U. message authentication ID, representative HoA, representative CoA, authentication information, etc.

<6> The AAA server 13 receiving the authentication request in the <5> returns the authentication result to the HA 12.

<6a> At this time, the AAA server acquires the group relationship data, that is, the HoA list, and representative HoA information at the same time from the subscriber data D5 inside the database 25 and sends them to the HA 12.

The HA 12 holds the sent group relationship data D4 between the representative HoA and the subordinate HoAs inside the database 23.

Further, using the relationship data between the representative HoA and subordinate HoAs and the representative HoA (HoAa) and representative CoA (CoAa) received first in the <4>, the HA 12 creates the subordinate CoAs (CoAb,CoAb) for the subordinate HoAs (HoAb, HoAc) through the steps (i), (ii), and (iii).

<7> The HA 12 further stores these as position registration data D3 in the database 24. This concludes the position registration in the HA 12 for the providers (A, B, and C) as to the terminal 11.

<8> After the completion of the position registration in <7>, the HA 12 returns an acknowledgement as a binding Ack to the terminal 11.

<8'> The terminal 11 receives this binding Ack and changes the temporary registration at <3> to a formal registration.

The position registration method in the mobile communication system 10 explained above may be summarized as follows.

When an IP address assigned to a terminal 11 is an IPv6 address, a representative care-of address and subordinate care-of addresses (CoA) are created with the subnet IDs of the IPv6 address.

The representative care-of address created by the terminal 11 is replaced with the subnet IDs of the subordinate home addresses (HoA) to create subordinate care-of addresses.

When there are a plurality of subordinate home addresses, the representative care-of address created by the terminal 11 is replaced with the subnet IDs of the subordinate home addresses to create subordinate care-of addresses.

The terminal 11 stores the representative address set and subordinate address sets and sends and receives packets corresponding to the representative address set and subordinate address sets.

When the IP address assigned to the terminal 11 is an IPv6 address, the home agent 12 receives a position registration request containing a representative address set comprised of a representative home address (HoA) and a representative care-of address (CoA) expressed by the subnet ID of the IPv6 address.

The home agent 12 acquires the subordinate home addresses grouped with the representative home address in advance and replaces the representative care-of address (CoA) received from the terminal 11 with the subnet IDs of the subordinate home addresses (HoA). Due to this, it creates subordinate care-of addresses, acquires subordinate address sets, and registers the positions of the subordinate address sets simultaneously with the positions of the representative address set.

The home agent 12 registers the representative address set and the subordinate address sets and transfers packets to the related destination based on the registration when the agent 12 receives the packets corresponding to the representative address set and subordinate address sets.

The mobile communication system 10 is further provided with an authentication/authorization server (AAA) 13 for at least carrying out authentication and authorization for the terminal 11. This authentication/authorization server sets and holds one home address HoA, as a representative home address, from among a plurality of home addresses HoA and the rest as subordinate home addresses. Due to this, when the terminal 11 is first connected to the network or when the terminal 11 is being re-authenticated, the server 13 provides the stored representative home address and subordinate home addresses to the terminal 11.

The mobile communication system 10 is further provided with an authentication/authorization server (AAA) 13 for at least carrying out authentication and authorization for the terminal 11. This authentication/authorization server sets and holds one home address HoA, as a representative home address, from among a plurality of home addresses HoA and the rest as subordinate home addresses. Due to this, when the terminal 11 is being authenticated, the server 13 responds to a request from the home agent 12 and provides the stored representative home address and subordinate home addresses to the home agent 12.

The position registration request from the terminal 11 may contain information on the "lifetime" indicating the period of validity of the position registration or authentication key.

The home agent 12 monitors the lifetime contained in the representative address set received from the terminal 11 and cancels the registration of the representative address set and the subordinate address sets when the period of validity illustrating by the lifetime expires or when the home agent 12 receives a lifetime from the terminal 12 in which zero is indicated.

Figure 5:
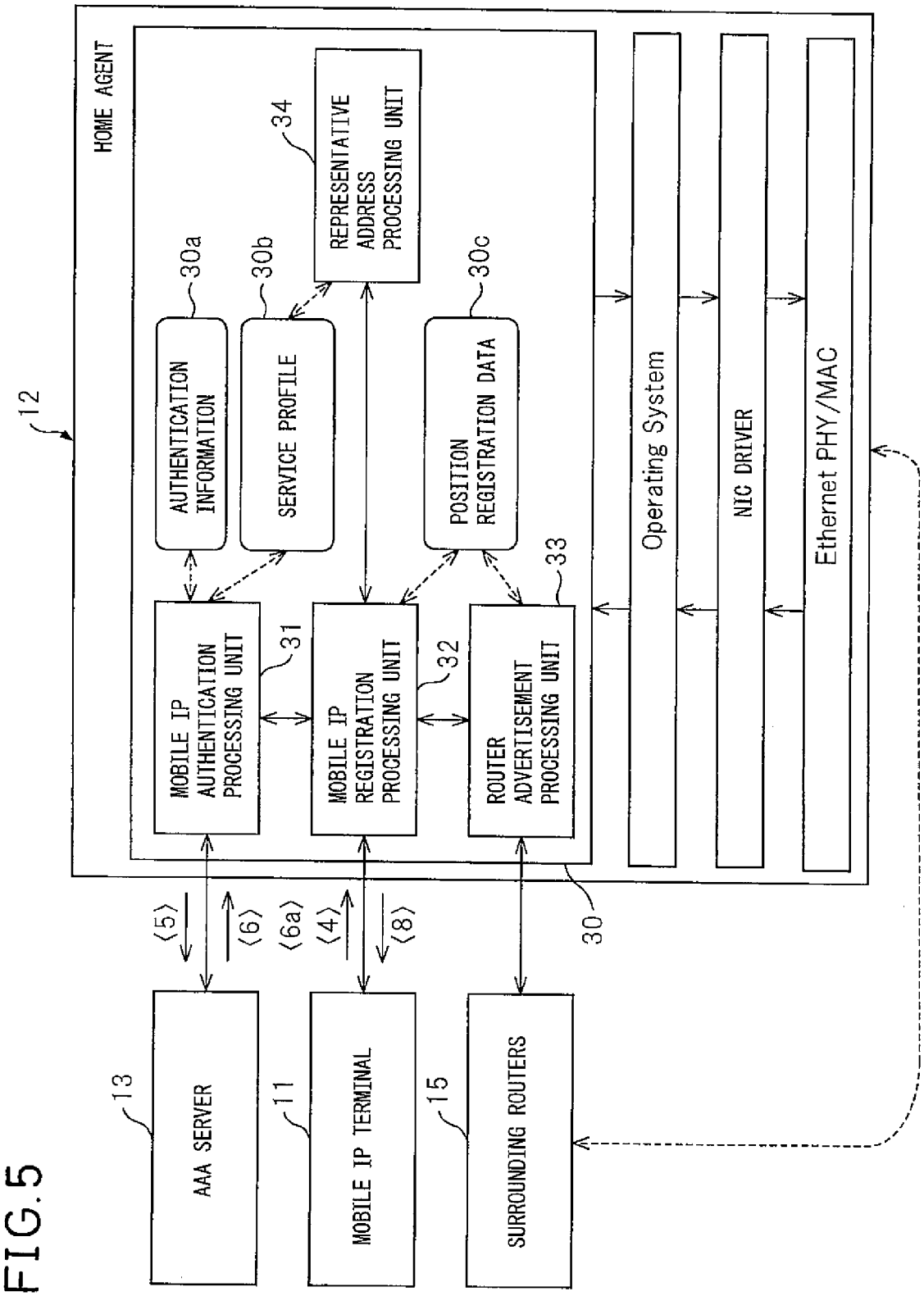
FIG. 5 is a view illustrating an example of a hardware configuration of a home agent.

FIG. 5 is a view illustrating a hardware configuration of a home agent. In the figure, reference number 30 indicates the hardware portion of the home agent (HA) 12. This is comprised of a terminal authentication processing unit (mobile IP authentication processing unit) 31, terminal registration processing unit (mobile IP registration processing unit) 32, router advertisement processing unit 33, and representative address processing unit 34. The databases linked to these units are indicated as 30a to 30c. Reference numeral 30a indicates authentication information, 30b a service profile, and 30c position registration data.

Below the agent 30 is an ordinary operating system, NIC (Network Interface Card) driver, and Ethernet™ PHY/MAC layer unit. Connections for the authentication/authorization AAA server 13, terminal (mobile IP terminal) 11, and surrounding router 15 with each of the processing units 31, 32, and 33 inside the device 30 are carried out through these operating system etc.

The mobile IP registration processing unit 32 receives the position registration request (binding update message) from the mobile IP terminal 11 and carries out position registration. Before the position registration, the mobile IP registration processing unit 32 sends a request to the mobile IP authentication processing unit 31 to investigate the authentication information 30a and service profile 30b of the relevant user.

However, the authentication information 30a and service profile 30b of the relevant user do not initially exist inside the HA 12, so the mobile IP authentication processing unit 31 acquires the authentication information 30a and service profile 30b from the AAA server 13 when an authentication request is sent to the AAA server 13 (refer to <6a> of FIG. 3).

The mobile IP registration processing unit 32 investigates the service profile 30b acquired after authentication using the received B.U. message and authentication information 30a and judges if the received B.U. message corresponds to the representative home address (HoA). If it is judged to correspond to the representative home address, the mobile IP registration processing unit 32 sends the received B.U. message to the representative address processing unit 34.

A quasi binding update (B.U.) message for the subordinate address sets is created based on the contents of the received B.U. message and the service profile 30b within the representative address processing unit 34. Further, the representative address processing unit 34 returns the created quasi B.U. message to the mobile IP registration processing unit 32. In the above example, two subordinate address sets HoAb/CoAb and HoAc/CoAc are desirable, so the quasi B.U. message is returned twice.

The mobile IP registration processing unit 32 receives the B.U. message for the representative address set (HoAa-CoAa), carries out processing for the steps (i), (ii), and (iii) in response to the two quasi B.U. messages returned from the representative address processing unit 34, and carries out position registration for the representative address set and two subordinate address sets each.

Therefore, if the position registration data 30c is updated, in the same way as the past, the router advertisement processing unit 33 advertises this to the surrounding routers 15, whereby the surrounding routers 15 are informed that the HA 12 is carrying out routing for packets corresponding to the representative HoA and subordinate HoAs.

Summarizing the home agent 12, this home agent is further provided with

- a terminal registration processing unit (mobile IP registration processing unit) 32 using a terminal 11 acquiring home addresses HoA corresponding to a plurality of types of services as a representative home address and subordinate home addresses and creating a representative address set comprised of the representative home address and a representative care-of address (CoA) paired with this and receiving a position registration request containing this representative address set,
- a terminal authentication processing unit 31 responding to the position registration request and receiving the authentication and authorization for the terminal 11 by the authentication/authorization server (AAA) 13, then acquiring a representative home address for the terminal 11 and subordinate home addresses forming a group with the same, and
- a representative address processing unit 34 driven by the terminal registration processing unit 31 after the authentication and authorization, judging the necessity of position registration with the representative home address and subordinate home addresses, and, when "necessary", creating a quasi position registration request with the subordinate home addresses and returning it to the terminal registration processing unit 31.

The terminal registration processing unit 32 responds to the quasi position registration request, creates subordinate care-of addresses corresponding to the subordinate home addresses to acquire subordinate address sets, and carries out position registration of the subordinate address sets simultaneously with position registration of the already received representative address set.

Further, the home agent 12 is further provided with a router advertisement processing unit 33 advertising to the surrounding routers after position registration by the terminal registration processing unit 32.

Figure 6:
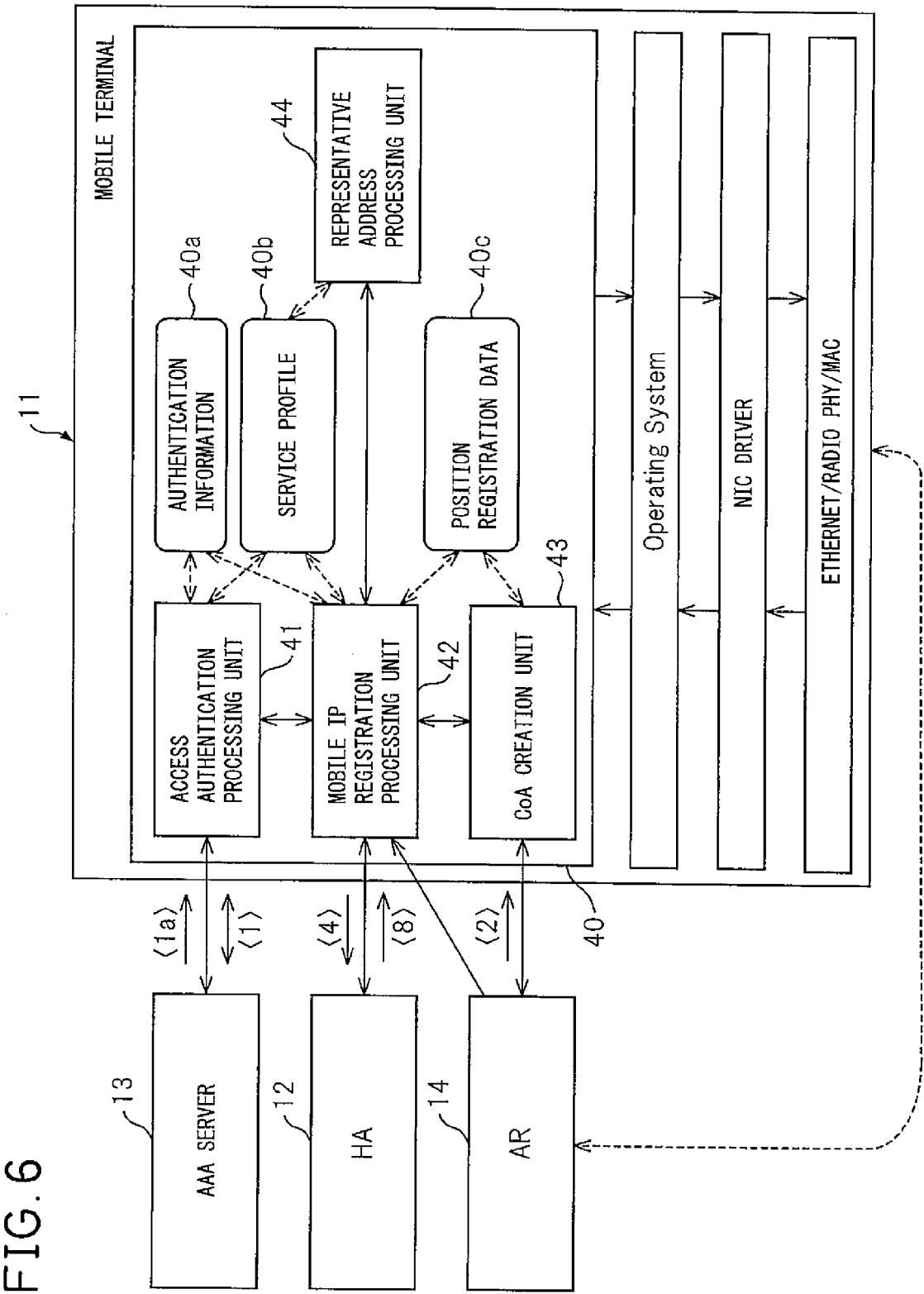
FIG. 6 is a view illustrating an example of a hardware configuration of a terminal.

FIG. 6 is a view illustrating an example of a hardware layout of a terminal. In the figure, reference number 40 indicates the interior constituents of the terminal 11. This is comprised of an access authentication processing unit 41, terminal registration processing unit (mobile IP registration processing unit) 42, care-of address creation unit (CoA creation unit) 43, and representative address processing unit 44. The databases linked to these units are indicated as 40a to 40c. Reference numeral 40a indicates authentication information, 40b a service profile, and 40c position registration data.

In FIG. 6, the access authentication processing unit 41 carries out authentication with the AAA server 13 when the terminal (mobile IP terminal) 11 is first connecting to the network or when it is being re-authenticated. At this time, the access authorization processing unit 41 acquires an authentication key (40a) for mobile IP authentication and a service profile 40b containing an HoA list (group relationship data), and etc.

Then, if a router advertisement (advertisement of the global routing prefix) is received from the AR 14, the terminal IP registration processing unit 42 is started up.

The terminal IP registration processing unit 42 investigates the service profile 40b and judges if position registration with the representative address set is necessary (whether there are two or more home addresses).

If it judges that position registration with the representative address set is necessary, the terminal registration processing unit 42 calls up the CoA creation unit 43 and sends the global routing prefix and the HoA list to the CoA creation unit 43. This CoA creation unit 43 creates CoAs (CoAb and CoAc) for exactly the same number of subordinate HoAs (for example, two; HoAb and HoAc) following the steps (i), (ii), and (iii).

Further, the CoA creation unit 43 creates an interface ID (FIG. 8) from the MAC address, combines the global routing prefix and the subnet ID of the representative HoA received from the terminal (mobile IP) registration processing unit 42, creates CoAs (two; CoAb and CoAc) for exactly the same number of subordinate HoAs (two; HoAb and HoAc), and returns them to the terminal (mobile IP) registration processing unit 42.

The registration processing unit 42 temporarily registers the combined information of the created HoA and CoA as position registration data 40c, sends a binding update (B.U.) message for the representative address set to the home agent (HA) 12, and carries out position registration inside the HA 12.

Then, if a binding Ack message from the home agent (HA) 12 is received, the data temporarily registered in the position registration data 40c is formally registered.

To summarize the terminal 11, this terminal is provided with

- an access authentication processing unit 41 carrying out authentication and authorization with an authentication/authorization server (AAA) 13 and acquiring home addresses HoA corresponding to a plurality of types of services as a representative home address and subordinate home addresses,
- a terminal registration processing unit 42 starting up when receiving a router advertisement (RA) after authentication and authorization,
- a representative address processing unit 44 driven by the started-up terminal registration processing unit 42, judging if position registration with the representative home address and subordinate home addresses is necessary based on information relating to the home address acquired by the access authentication processing unit 41, and returning the judgment results to the terminal registration processing unit 42, and
- a care-of address creation unit 43 creating a representative care-of address and subordinate care-of addresses (CoA) paired with the representative home address and subordinate home addresses (HoA).

In pairs of the representative address set and subordinate address sets, only the representative address set is used to make a position registration request to the home agent.

Figure 7:
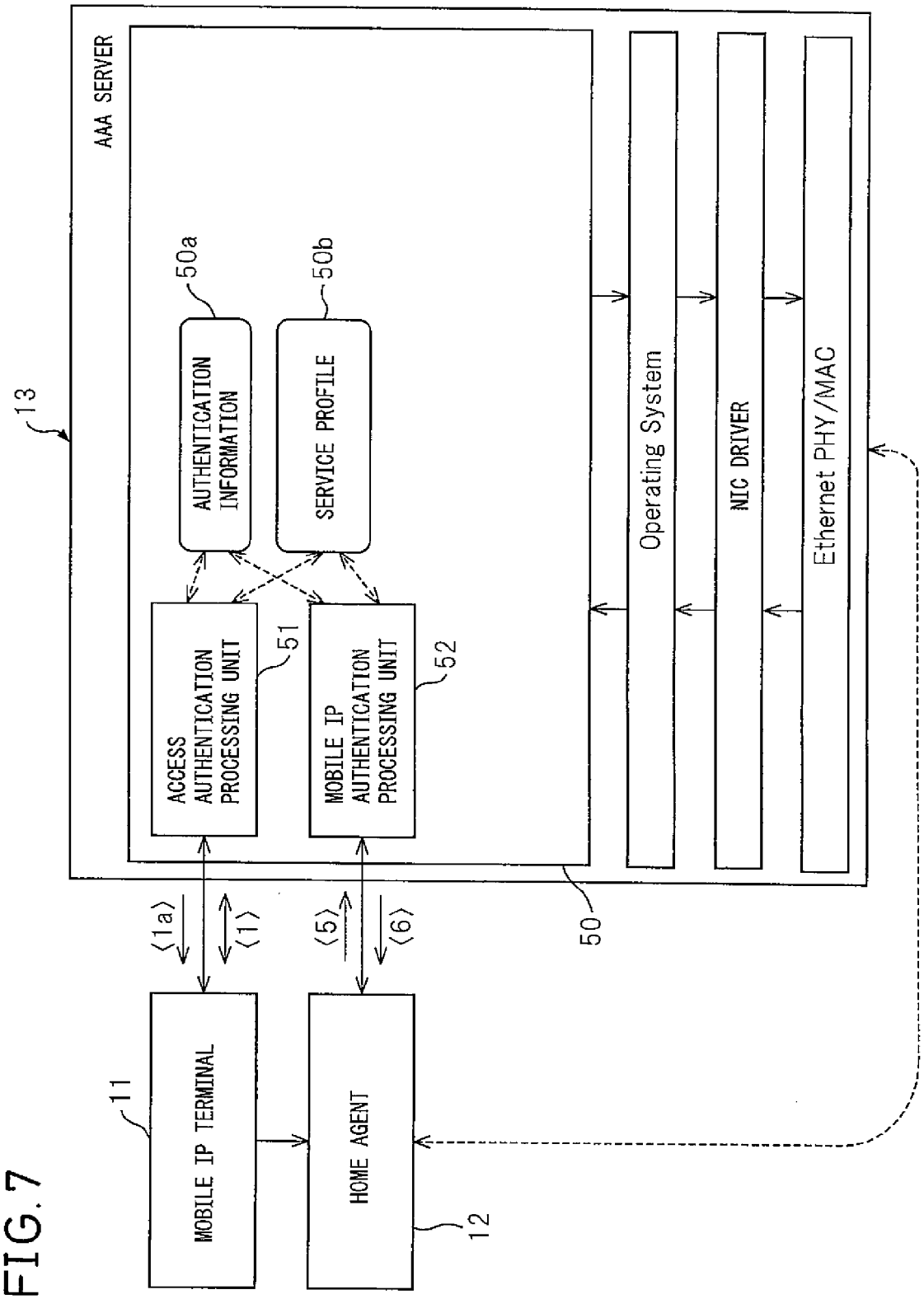
FIG. 7 is a view illustrating an example of a hardware configuration of an AAA server.

FIG. 7 is a view illustrating an example of a hardware layout of an AAA server. In the figure, reference number 50 indicates a hardware portion of the AAA server 13. This is comprised of the access authentication processing unit 51 and the terminal authentication processing unit (mobile IP authentication processing unit) 52. The databases linked to these units are indicated as 50a and 50b. Reference numeral 50a indicates authentication information and 50b a service profile. Note that, explanations for what is below the agent 50 is the same as the explanations in FIG. 5.

In FIG. 7, the access authentication processing unit 51 of the AAA server 13 carries out access authentication with respect to the terminal 11 when the mobile IP terminal 11 first connects to the network or when being re-authenticated. At this time, the HA 12 creates the authentication key necessary for mobile IP authentication for the terminal 11 as well as extracts the HoA list (group relationship data) of FIG. 4 acquired in advance at the time of contract from the service profile 50b and sends it to the mobile IP terminal 11 <1a>.

Then, the AAA server 13 carries out mobile IP authentication with respect to the mobile IP terminal 11. At this time, the authentication information from the mobile IP terminal 11 is transferred by the binding update (B.U.) message to the home agent (HA) 12 <4>, so it receives the authentication request from the home agent (HA) 12 directly.

The mobile IP authentication processing unit 52 receives the authentication request from the home agent (HA) 12 and, if confirming the existence of the authentication information 50a and service profile 50b corresponding to the authentication ID, sends to the home agent 12 the authentication information 50a and the service profile 50b containing the HoA list (group relationship data) and the like. <6a>.

To summarize the authentication/authorization (AAA) server 13, this AAA server
- stores the home addresses HoA corresponding to the plurality of types of services received by the terminal 11 as a representative home address and subordinate home addresses and is provided with
- an access authentication processing unit 51 carrying out authentication and authorization with the terminal 11 and providing the stored representative home address and subordinate home address information to the terminal 11 and
- a terminal authentication processing unit 52 carrying out authentication and authorization for a terminal 11 with a request from the home agent 12 which received a position registration request from the terminal 11 and providing the stored representative home address and subordinate home address information to the home agent 12.

Due to the above, registration of a plurality of home addresses HoA and a plurality of care-of addresses CoA corresponding to the home addresses HoA are carried out in the home agent (HA) 12. It is necessary for the address registration inside this HA 12 to be cancelled when the terminal 11 moves away from the network etc. This is because if left uncancelled, it continues even after the terminal 11 moves away from the network and packets destined for the terminal 11 are transferred to the home agent (HA) 12.

Therefore, the terminal 11 includes in the position registration request of the binding update (B.U.) message using the representative home address (HoA) and representative care-of address (CoA), that is, the representative address set, information on the lifetime indicating the period of validity of the position registration request or the authentication key. This period of validity also includes zero.

On the other hand, the home agent (HA) 12 monitors the lifetime. When the lifetime or period of validity of the authentication key before position registration update expires, the current position registrations (both the representative address set and subordinate address sets) inside the HA 12 are cancelled. The cancellation of the position registration also includes cancellation when the period of validity of the authentication key expires before update of the authentication key due to re-authentication. Note that, data for both the representative address set and subordinate address sets is also, of course, deleted in the terminal 11.

Finally, a computer program for position registration based on the present invention is described. This is a program executing the following steps in the computer:
- a step of providing a plurality of home addresses HoA of a home agent 12 corresponding to a plurality of types of services and setting and holding one home address among the plurality of home addresses as a representative home address and the rest as subordinate home addresses,
- a step of having the terminal 11 create a representative care-of address (CoA) corresponding to the representative home address to make a representative address set and using this representative address set for sending a position registration request to the home agent 12, and
- a step of having the home agent 12 create subordinate care-of addresses making up subordinate address sets corresponding to the set subordinate home addresses based on the representative address set relating to the position registration request and simultaneously registering the position of this representative address set and registering the positions of the subordinate address sets.

REFERENCE SIGNS LIST 1 mobile communication system
2 home address holding function unit
3 position registration request function unit
4 position registration function unit
10 mobile communication system
11 terminal
12 home agent
13 authentication/authorization (AAA) server
14 advertisement router
31 terminal authentication processing unit
32 terminal registration processing unit
33 router advertisement processing unit
34 representative address processing unit
41 access authentication processing unit
42 terminal registration processing unit
43 care-of address creation unit
44 representative address processing unit
51 access authentication processing unit
52 terminal authentication processing unit

What is claimed is:

1. A mobile communication system comprising at least a terminal receiving a plurality of types of services and a home agent receiving a position registration request from the terminal when the terminal moves, said mobile communication system, comprising:
    a home address holding function unit setting and holding a plurality of home addresses corresponding to the plurality of types of services, where one of these home addresses is designated as a representative home address and the rest as subordinate home addresses,
    a position registration request function unit, at the terminal side, creating a representative address set and subordinate address sets from the representative home address and subordinate home addresses which are acquired from the home address holding function unit and representative care-of address and subordinate care-of addresses which correspond to these home addresses, and the position registration request function unit further sending a position registration request to the home agent with the use of only the representative address set and
    a position registration function unit, at the home agent side, receiving the representative home address and subordinate home addresses which are acquired from the home address holding function unit, creating subordinate address sets from the representative address sets relating to the above position registration request, and registering the positions of the subordinate address sets simultaneously with the registration of the position of the representative address set.

2. The mobile communication system as set forth in claim 1, further comprising an authentication/authorization server for carrying out at least authentication and authorization for the terminal and forming the home address holding function unit inside the authentication/authorization server.

3. A position registration method in a mobile communication system comprising at least a terminal receiving a plurality of types of services and a home agent receiving a position registration request from the terminal when the terminal moves, said position registration method comprising
setting a plurality of home addresses of the home agent corresponding to the plurality of types of services and setting and holding one home address among the plurality of the set home addresses as a representative home address and the rest as subordinate home addresses,
having the terminal create a representative care-of address corresponding to the representative home address to make a representative address set and sending a position registration request to the home agent with the representative address set, and
having the home agent create subordinate care-of addresses making up subordinate address sets corresponding to the set subordinate home addresses based on the representative address set according to the position registration request and registering the position of the subordinate address sets simultaneously with the registration of the positions of the representative address set.

4. The position registration method as set forth in claim 3, creating the representative care-of address and the subordinate care-of addresses with subnet IDs of an IPv6 address when the IP address assigned to the terminal is the IPv6 address.

5. The position registration method as set forth in claim 4, replacing the representative care-of address created by the terminal with a subnet ID of a subordinate home address to create a subordinate care-of address.

6. The position registration method as set forth in claim 5, replacing the representative care-of address created by the terminal with subnet IDs of subordinate home addresses to create subordinate care-of addresses when there are a plurality of subordinate home addresses.

7. The position registration method as set forth in claim 3, having the terminal hold the representative address set and subordinate address sets and receive and send packets corresponding to the representative address set and subordinate address sets.

8. The position registration method as set forth in claim 3, having the home agent receive a position registration request containing a representative address set comprised of a representative home address and a representative care-of address expressed by a subnet ID of an IPv6 address when the IP address assigned to the terminal is the IPv6 address.

9. The position registration method as set forth in claim 8, having the home agent acquire in advance subordinate home addresses forming a group with a representative home address, replace the representative care-of address received from the terminal with the subnet IDs of the subordinate home addresses to create subordinate care-of addresses, and acquire subordinate address sets and register the positions of the subordinate address sets simultaneously with the position of the representative address set.

10. The position registration method as set forth in claim 9, having the home agent register the representative address set and subordinate address sets and transfer packets to the related destination based on the registration when the packets corresponding to the representative address set and subordinate address sets are received.

11. The position registration method as set forth in claim 3, which
has the mobile communication system further provided with an authentication/authorization server for carrying out at least authentication and authorization for the terminal and
has the authentication/authorization server execute setting and holding one of the plurality of set home addresses as a representative home address and the rest as subordinate home addresses and provide the terminal with the held representative home address and subordinate home addresses, when first connecting the terminal to the network or when re-authenticating the terminal.

12. The position registration method as set forth in claim 3, which
has the mobile communication system further provided with an authentication/authorization server for carrying out at least authentication and authorization for the terminal and
has the authentication/authorization server execute the step of setting and holding one of the plurality of set home addresses as a representative home address and the rest as subordinate home addresses and provide the home agent with the held representative home address and subordinate home addresses in response to a request from the home agent, when authenticating the terminal.

13. The position registration method as set forth in claim 3, which includes, in the position registration request from the terminal, information on a lifetime indicating the period of validity of the position registration or authentication key.

14. The position registration method as set forth in claim 3, which has the home agent monitor the lifetime contained in the position registration request received from the terminal and cancel the registrations of the representative address set and subordinate address sets when the period of validity indicated by the lifetime expires or when a lifetime with an indication of zero is received from the terminal.

15. A terminal comprising:
an access authentication processing unit carrying out authentication and authorization with an authentication/authorization server and acquiring home addresses corresponding to a plurality of types of services as a representative home address and subordinate home addresses;
a terminal registration processing unit starting up upon receipt of a router advertisement after authentication and authorization;
a representative address processing unit driven by the started-up terminal registration processing unit, judging, based on information relating to the home address acquired by the access authentication processing unit, whether position registration with the representative home address and subordinate home addresses is necessary, and returning the judgment results to the terminal registration processing unit; and
a care-of address creation unit creating a representative care-of address and subordinate care-of addresses paired with the representative home address and subordinate home addresses, and
sending a position registration request to the home agent with only the representative address set from among the paired representative address set and subordinate address sets.

16. An authentication/authorization server comprising:
a storing unit storing a plurality of home addresses corresponding to a plurality of types of services received by a terminal, where one of these home addresses is designated as a representative home address and the rest as subordinate home addresses;

an access authentication processing unit carrying out authentication and authorization with the terminal and providing the information of the held representative home address and subordinate home addresses to the terminal; and a terminal authentication processing unit carrying out authentication and authorization for the terminal by a request from a home agent receiving a position registration request from the terminal and providing the held representative home address and subordinate home addresses to the home agent.

17. A non-transitory computer readable medium having a position registration program stored therein for carrying out position registration in a mobile communication system comprising at least a terminal receiving a plurality of types of services and a home agent receiving a position registration request from the terminal when the terminal moves, such position registration program making a computer execute:

a step of setting a plurality of home addresses of the home agent corresponding to the plurality of types of services and setting and holding one of the set plurality of home addresses as a representative home address and the rest as subordinate home addresses, a step of having the terminal create a representative care-of address corresponding to the representative home address to make a representative address set and using this representative address set for sending a position registration request to the home agent, and a step of having the home agent create subordinate care-of addresses making up subordinate address sets paired with the set subordinate home address based on the representative address set relating to the position registration request and register the positions of the subordinate address sets simultaneously with the registration of position of the representative address set.

* * * * *